United States Patent [19]

Anderson et al.

[11] Patent Number: 6,078,892

[45] Date of Patent: Jun. 20, 2000

[54] METHOD FOR CUSTOMER LEAD SELECTION AND OPTIMIZATION

[75] Inventors: Gary Floyd Anderson, Danbury, Conn.; Paul Bao-Luo Chou, Montvale, N.J.; Pasumarti V. Kamesam, White Plains, N.Y.

[73] Assignee: International Business Machines Corporation, Armonk, N.Y.

[21] Appl. No.: 09/057,633

[22] Filed: Apr. 9, 1998

[51] Int. Cl.[7] .................................................... G06F 17/60
[52] U.S. Cl. .................................. 705/10; 705/14; 707/2; 345/327
[58] Field of Search ....................... 705/10, 14; 345/327; 707/2

[56] References Cited

U.S. PATENT DOCUMENTS

| | | | |
|---|---|---|---|
| 5,687,322 | 11/1997 | Deaton et al. | 705/14 |
| 5,724,567 | 3/1998 | Rose et al. | 707/2 |
| 5,835,087 | 11/1998 | Herz et al. | 345/327 |
| 5,857,175 | 1/1999 | Day et al. | 705/14 |
| 5,893,075 | 4/1999 | Plainfield et al. | 705/14 |

OTHER PUBLICATIONS

Masahiro Morita & yoichi Shinoda, 'Information Filtering Based on User Behavior analysis and Best Match Text Retrieval', Proceedings of the Seventeenth Annual International ACM–SIGIR Conference on Research and development in Informaton Retrieval, Dublin, Jul. 3–6, 1994.

Goldberg, David et al., 'Using Collaborative filtering to Weave an Information Tapestry', Communications of the ACM, vol. 35, No. 12, pp. 61–70, Dec. 1991.

Russell Labe, "Database Marketing Increases Prospecting Effectiveness in Merrill Lynch", Interfaces, 24:5 (pp. 1–12), Sep. 1994.

www.ibsassn.com.

"Database Marketing Increases Prospecting Effectiveness in Merrill Lynch", Russell Labe, Interfaces, 24:5 Sep.–Oct. , 1994 (1–12).

*Primary Examiner*—Eric W. Stamber
*Assistant Examiner*—Akiba Robinson-Boyce
*Attorney, Agent, or Firm*—Whitham, Curtis & Whitham; Stephen C. Kaufman

[57] ABSTRACT

A method for retrieving information from a database includes pre-scoring each of a plurality of records in the database to determine their relevance to a particular item of interest, specifying at least one trait corresponding to a type of information sought to be retrieved, searching the database to derive a collection of records which satisfy the trait, and ordering the records in the first collection to identify the records most relevant to the item of interest. In order to further derive the most relevant records, a plurality of traits may be specified to effect multiple levels of searching. A predetermined number of the records may then be output without superfluous information, to increase the density, clarity, and coherency of the output. Records may then be selected for pursuit. A system and computer process implement one or more steps of the method.

46 Claims, 6 Drawing Sheets

METHOD FOR CUSTOMER LEAD SELECTION AND OPTIMIZATION

BACKGROUND OF THE INVENTION

1. Field of the Invention

This invention generally relates to information storage and retrieval, and more particularly to a method of searching for information in a database or other storage device based on a given set of preferences specified by a user. The invention further relates to a system and computer process having a program for accomplishing the same objectives.

2. Description of the Related Art

The advent of the database marked a substantial advance in information technology. Among other things, it has enabled large quantities of information to be stored at a central location and manipulated by built-in application software. The appeal of the database has only been magnified in recent years. Today, databases are equipped with search tools that will allow users to retrieve information by specifying one or more key words. The results of the search are then returned in mere seconds, a task which would have taken hours if manually performed.

The business world quickly realized the advantages of the database. Law enforcement uses the database to maintain criminal files, and the medical profession uses it to organize patient records. Other databases manage accounts, perform inventory control, store census data, and implement a variety of administrative and governmental functions. In one way or another, virtually every type of business and individual has been affected by use of the database.

Merchants have benefitted from marketing databases in their pursuit to sell products. Typically, these databases are loaded with customer information (e.g., demographic data) that can be searched to determine which customers might be inclined to purchase a particular product of interest. This is especially useful in finding customers in so-called niche markets, i.e., specific segments of the market which have demonstrated an affinity for certain products. The toy market is an example of one. Instead of mass mailings and other manual approaches, merchants can search their databases to find individuals or businesses having traits which are likely to match certain products. These customers, or customer prospects, can then be pursued with a potentially higher rate of success.

In spite of these advantages, conventional marketing database approaches have drawbacks. Perhaps most significantly, results from conventional marketing database searches tend to be largely incoherent. They are, for example, often substantively deficient in that they are output in no particular order of relevance to the one or more products being sold. Consequently, sales agents have no real assurance that the information produced from their searches includes the best candidates for their products.

Second, many results from conventional marketing database searches are superfluous in nature. These results, for example, are often cluttered with customer contact information, which is considered superfluous, at least initially, because many of the results likely will not prove to be of value. Conventional marketing database search results, thus, tend not to be concise.

Third, results from conventional marketing database searches are often too many in number to be comprehensible. In these cases, sales agents are left with the unenviable task of wading through pages and pages of largely irrelevant output just to locate customer prospect that might prove worthy of pursuit. There is a real likelihood, then, that important customer prospects may be overlooked when results of the search turn out to be large.

The above-noted drawbacks are not unique to marketing databases. Other information systems suffer from the same or similar drawbacks, and thus are at least equally impaired as a research tool.

From the foregoing discussion, it is clear that information systems in use today are still rudimentary in nature. Word searches performed on them generate results which are often substantively wanting and incoherent, thereby adding to the workload of users by requiring them to perform additional investigative work.

A need therefore exists for a method of optimizing the retrieval of information from an information system, one which produces search results in a substantively meaningful and concise way. In the marketing field especially, a need exists for a method which can be customized to output only that customer prospect information which is the best or most relevant in relation to a particular product, and which is also free from superfluous information.

SUMMARY OF THE INVENTION

It is a first objective of the present invention to provide a method of searching for information in an information system which will, with pinpoint accuracy, locate information considered most relevant to a subject of the search, and which will then output that information in a substantively meaningful and concise way.

It is a second objective of the present invention to achieve the first objective by pre-scoring information stored in the system, to quantatively relate the relevance of that information to the subject of the search, and by then outputting information produced from the search preferably in a ranked order of relevance based on score.

It is a third objective of the present invention to provide a method of searching for information in an information system, which method may be customized by limiting the quantity and content of the information output from the search so that it is free from superfluous subject matter.

It is another objective of the present invention to provide, more specifically, a method for retrieving customer lead information from a marketing database, which method, locates the best customer leads for one or more products of interest.

It is another objective of the present invention to achieve the aforementioned objective by scoring each of the customer records in the marketing database prior to searching, to thereby determine their relevance to the product of interest, and then to output the results of the search in the order scored.

It is another objective of the present invention to provide a method, as previously described, which allows customer lead information to be obtained as a result of a customized search request, which request contains information specifying a set of preferences which correspond to a type of customer the agent would like to solicit.

It is another objective of the present invention to provide a method, as previously described, which initially outputs the best customer leads without customer contact information, and then supplies contact information for only those customer leads specifically selected by an agent.

It is another objective of the present invention to provide a method in accordance with any of those previously described which is interactive in nature.

It is another objective of the present invention to provide a computer process having a program which causes a computer to perform the steps in any of the previously described methods.

It is another objective of the present invention to provide a system for retrieving information in accordance with any of the previously described methods.

The foregoing and other objectives of the invention are achieved by providing a method for retrieving customer lead information from a marketing database, which method includes as, an initial step, assigning scores to customer records in the database. Each of the scores is computed based on a comparison between information in a respective one of the customer records and the product of interest, which scores are then assigned as a quantitative indication of a likelihood of a match between the records and the product. Sales agents may then customize the method by specifying zero or more preferences reflecting the type of customer that he would like to do business with, e.g., if the agent likes to work with persons of a particular age he may enter an appropriate age range as a preference.

After these steps, the method includes searching the database to locate, as a collection of records, customer records which satisfy the one or more preferences specified. The records in the collection are then ordered based on the scores assigned to them in the initial step, and then a predetermined number of them (e.g., the highest-scored records) are output to identify the best customer leads for the product specified and the preferences given. Preferably, these records are output without customer contact information, in order to reduce the overall price of the search if the search is performed on a per-cost basis. Also, advantageously, withholding contact information preserves the anonimity of the customer leads output, thus allowing an agent access to information he otherwise might not be privy to if the customers identities were output. The agent then may select those records which he would like to pursue, which selection then effects the downloading of corresponding contact information.

In optional steps of the method, a sales agent specifies in the search request a set of mandatory preferences and a set of desired preferences. In such a situation, the database is searched to locate, as a first collection of records, those customer records which satisfy the mandatory preferences. The number of records in the first collection are then ordered by score and compared against a predetermined number. If this predetermined number is exceeded, the predetermined number of records having the highest scores are defined as a second collection of records.

The records in the second collection are then searched to determine how closely the data records in the second collection satisfy the desired preferences. New scores are then assigned to indicate how closely the customer records in the second collection satisfy the desired preferences. The records in the second collection are then ordered based on the new scores and a predetermined number of them (e.g., the highest-scored records) are output, without contact information, for selection by the agent.

The present invention is also a method for retrieving information from an information system which is not necessarily at all related to marketing. The method includes:

measuring a relationship between each of a plurality of data records in the system and an item of interest by comparing the item of interest to information in each of said data records;

designating a trait;

searching the data records to determine which ones possess the trait;

defining, as a first collection of data records, those records possessing the trait; and arranging the data records in the first collection based on the relationship measured in the measuring step.

The present invention is also a computer process having a program for causing the computer to perform the steps in the previously described methods.

The present invention is also a system for retrieving information, which system includes:

a storage device for storing a plurality of customer records;

a first processor for determining scores for each of the customer records, with each score indicating a relationship between a respective one of the customer records and a product;

an input device for receiving a search request containing at least one preference;

a second processor for processing the search request to derive a first collection of customer records which satisfy the preference, which processor then sorts the customer records in the first collection based on scores assigned to them;

a memory unit for storing a predetermined number of the sorted customer records from the first collection; and an output device for outputting at least one customer record from the first collection.

Advantageously, the system may include a plurality of input devices, any one or more of which may be linked by a network to the first and second processors to allow searches to be performed remotely.

DESCRIPTION OF THE PREFERRED EMBODIMENTS

The present invention is, in one respect, a method of searching for information in an information system, which system includes a storage device for storing therein a plurality of data records. The method is particularly well suited to assisting users in locating information from among a large quantity of records, although, as one skilled in the art can appreciate, the invention need not be so limited as it may be customized to meet the needs of an information system of any size. As such, and to maximize its versatility, the present invention may be adapted to search records in any conventionally known storage device, including but not limited to a database and CD ROM, as well as various types of optical and magnetic storage media.

Figure 1:
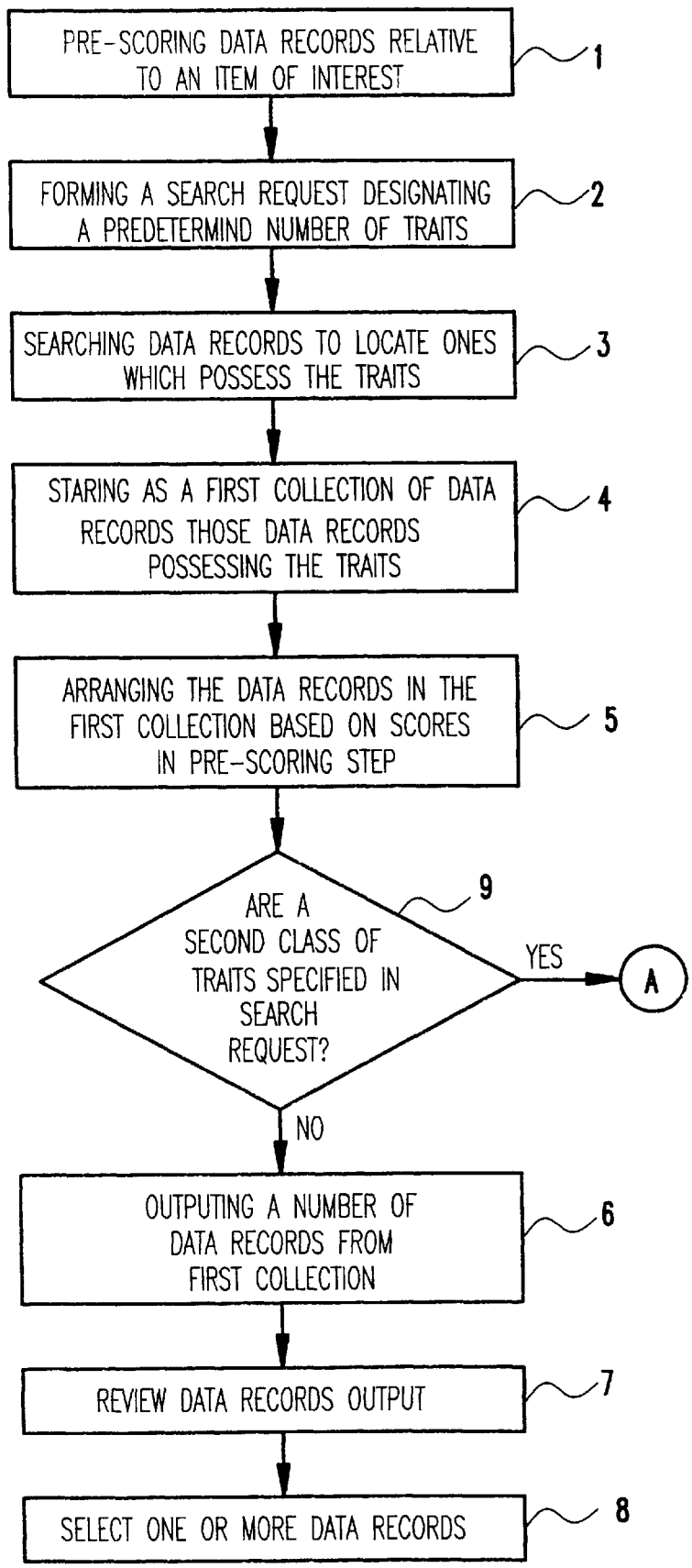
FIG. 1 is a block diagram of steps included in a first embodiment of the method of the present invention.

Referring to FIG. 1, a first embodiment of the method of the present invention includes, as an initial step, pre-scoring the data records in the storage device in a manner that will optimize their retrieval. This is accomplished by, first, determining how or to what extent each of the data records in the storage device are related to an item of interest. (Block 1). This relationship is measured, for example, by comparing the item of interest to information in the data records, e.g., to information in one or more data fields of each record. Preferably, as much information in the data records as needed is taken into consideration, so that a comprehensive determination may be made as to the relationship between the data records and the item of interest. Scores are then computed and assigned to each data record to indicate the relationship between the data records and the item of interest. The scores are then stored, either within or appended to the data records themselves, or in a separate memory.

This scoring process may be illustrated by considering the example of a financial services firm having a database of client information, which firm is seeking to find new clients for an item of interest in the form of a individual retirement account (IRA). Such a database would be sure to include demographic data for each client, one type of which might be the client's age. In locating clients in the database who might be interested in purchasing an IRA, the pre-scoring step of the invention may be accomplished by, first, evaluating the demographic data for each client and, then, determining, based on that data, whether those clients would likely be interested in purchasing an IRA. (The chance that a client in his fifties would buy and IRA, for example, would probably be much different from a client in his twenties. Scores would then be assigned to each client record to reflect this difference.)

After the pre-scoring step, the method of the present invention becomes interactive in nature. Specifically, in a second step of the method, a search request containing one or more traits is formulated (Block 2) and the data records are then searched to find those records which possess the given traits (Block 3). The search request may be created manually by a user at a workstation, or automatically by a computer either within or remotely located from the storage device.

In subsequent steps of the method, the data records satisfying the traits are stored as a collection of data records, either in the storage device or other memory. (Block 4). The data records in the collection are then arranged according to the scores computed for each during the pre-scoring step of the method. (Block 5). Preferably, the data records are arranged in descending order by score, so that data records having the highest scores and thus the ones which are most relevant appear first. Those skilled in the art can appreciate, however, that the data records in the collection may be sorted in any order desired.

Once sorted, a predetermined number of the data records in the collection may be output for review by a user. (Block 6). These records may be output, for example, with only a desired amount of information, e.g., only a data record descriptor and some demographic data. The number of data records that can be evaluated by a user at a single glance, thus, may be substantially increased, making for a more coherent and efficiently organized output. Those skilled in the art can appreciate, however, that the data records in the collection may be output in any desired manner.

Once output, a user can review the data records to determine which ones he deems to be of the most interest.

(Block 7). To assist in this review, the score for each record may be output to give further meaning to the search results. The user may then select one or more of the data records, at which time information in other data fields of the selected data records may be output to the user for further consideration. (Block 8).

The method of the present invention represents a substantial improvement in the art. By pre-scoring data records in the above-prescribed manner, the method of the present invention is able to side step having to compute scores after the searching step, a task which adds substantially to the overall time of the search. Further, ordering the data records increases the efficiency of the search, as it allows the search results to be reviewed at a faster rate compared with the results produced from searches of conventional information systems.

Optional steps of the method include designating in the search request a plurality of classes of traits. Under these circumstances, the search request is processed, hierarchically, to determine the degree to which the data records in the storage device relate to the item of interest. For example, when a plurality of classes of traits are specified in the search request, the searching step performed in Block 3 may be performed based on a first class of trait, and the data records stored and arranged in Blocks 4 and 5 may be said to form a first collection of data records.

Figure 2:
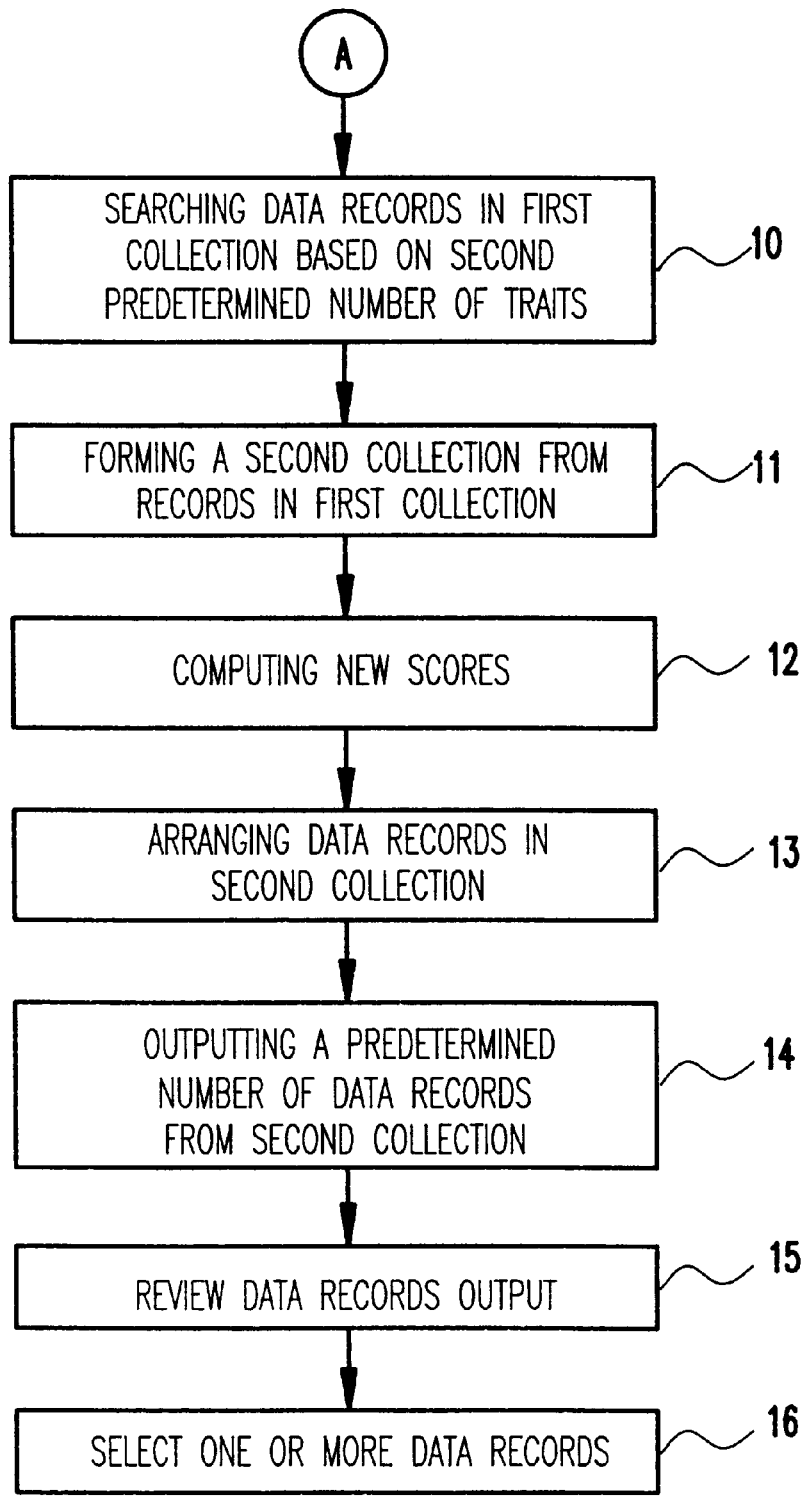
FIG. 2. is a continuation of the block diagram shown in FIG. 1.

Then, a subsequent step would involve determining whether a second class of traits have been specified in the search request. (Block 9). If so, as shown in FIG. 2, the data records in the first collection are searched to determine which records in the first collection satisfy the second class of traits. (Block 10). These traits may then be said to define a second collection of data records. (Block 11). A determination of how closely information in the data records of the second collection match the second class of traits may then be performed, and new scores may then be computed to reflect this relationship. (Block 12).

The data records in the second collection may then be arranged by new score (Block 13) and one or more of them output (e.g., highest-scored data records) for selection by the user (Block 14). These records may then be reviewed (Block 15) and selected (Block 16), at which time additional information may be downloaded. In other optional steps of the method, the user may designate a maximum number of data records to be included in the search results.

A second embodiment of the method of the present invention is applied as a tool for assisting sales agents in finding the best customers leads, or prospects, for one or more products of interest. The product of interest may be of any type, including retail items, financial instruments, and others including those usually solicited by telephone, mail, television, or on the internet.

The method is implemented by searching customer records which are preferably stored in a marketing database. Those skilled in the art can appreciate, however, that the invention is sufficiently versatile so that it may be adapted to search records in any size or type of storage device.

Figure 3:
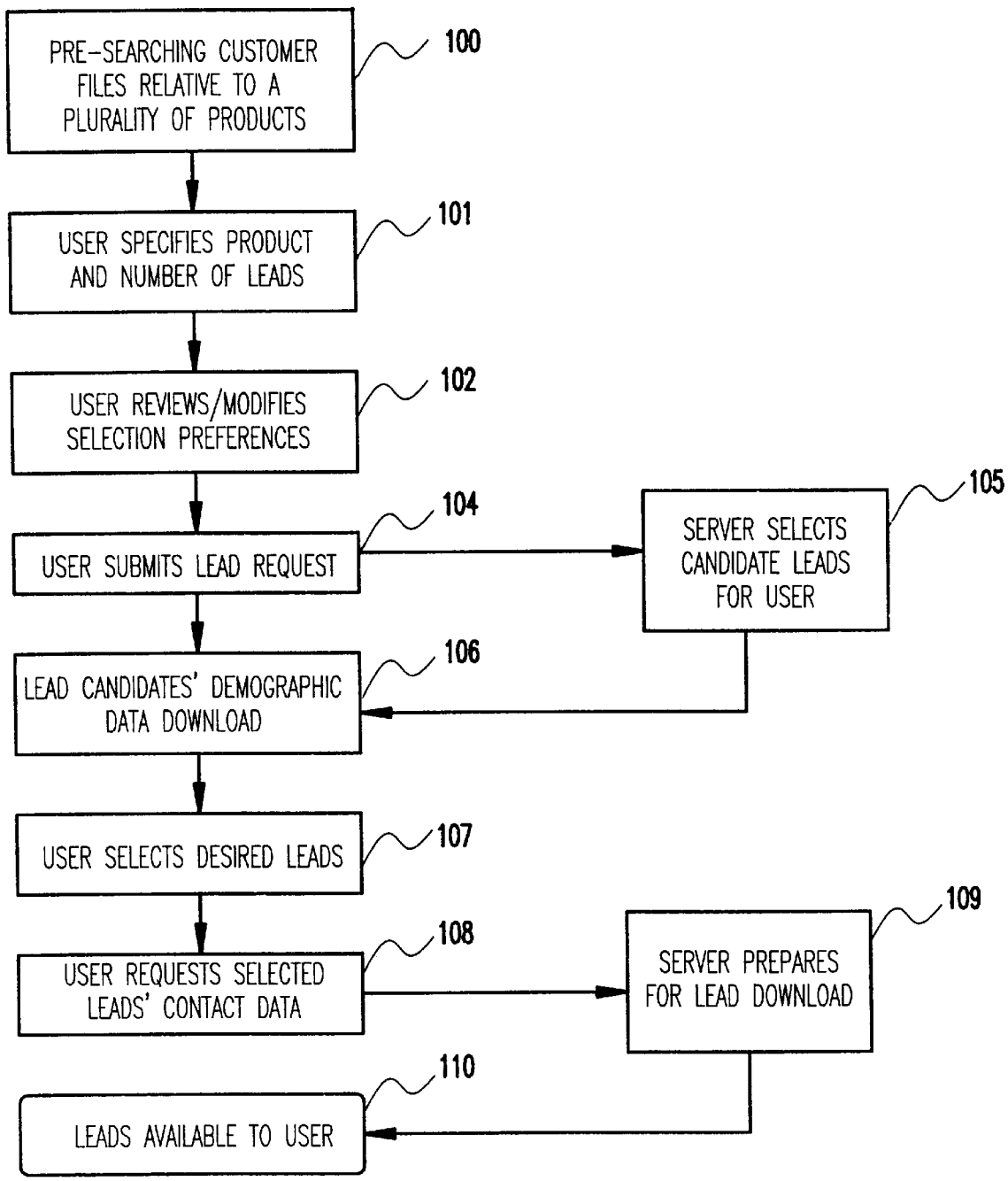
FIG. 3 is a flow diagram setting forth steps included in a second embodiment of the method of the present invention.

Referring to FIG. 3, an initial step of the method includes computing a score for each customer record in the marketing database for each of the products for sale by the agent. (Block 100). The scores for each customer record are computed, preferably, in accordance with an external process which compares customer descriptive information in the customer record with the products and then returns as scores values indicating whether a match would likely exist between the customer record and the products, i.e., returns scores indicating whether a customer associated with the record is likely to buy the products. The customer descriptive information may include, for example, demographic data (e.g., name, address, sex, age of a customer), data describing the nature and peculiarities of a customer's business (e.g., annual sales, geographic coverage, size), or any other information which might be important in assessing a customer's affinity for a particular product.

The scores may, for example, be computed by developing statistical models with techniques such as logistic regression or rule induction, or techniques based on various forms of neural networks. Such models typically relate prospect demographics (independent explanatory variables) to "propensity to buy" (dependent, business variable) using historical data collected through past marketing campaigns. Alternative business variables such as predicted revenue or customer loyalty can be used for scoring, if the objective is to maximize revenue or identify long-term customers, rather than expanding customer base. One reference disclosing scoring techniques of this type is by Russell Labe, entitled "Database Marketing Increases Prospecting Effectiveness in Merrill Lynch", Interfaces, 24:5 September–October 1994 (1–12).

Once all the scores are computed for the customer records, the scores are stored, in an associative manner, either in the marketing database or another storage device.

Figure 4:
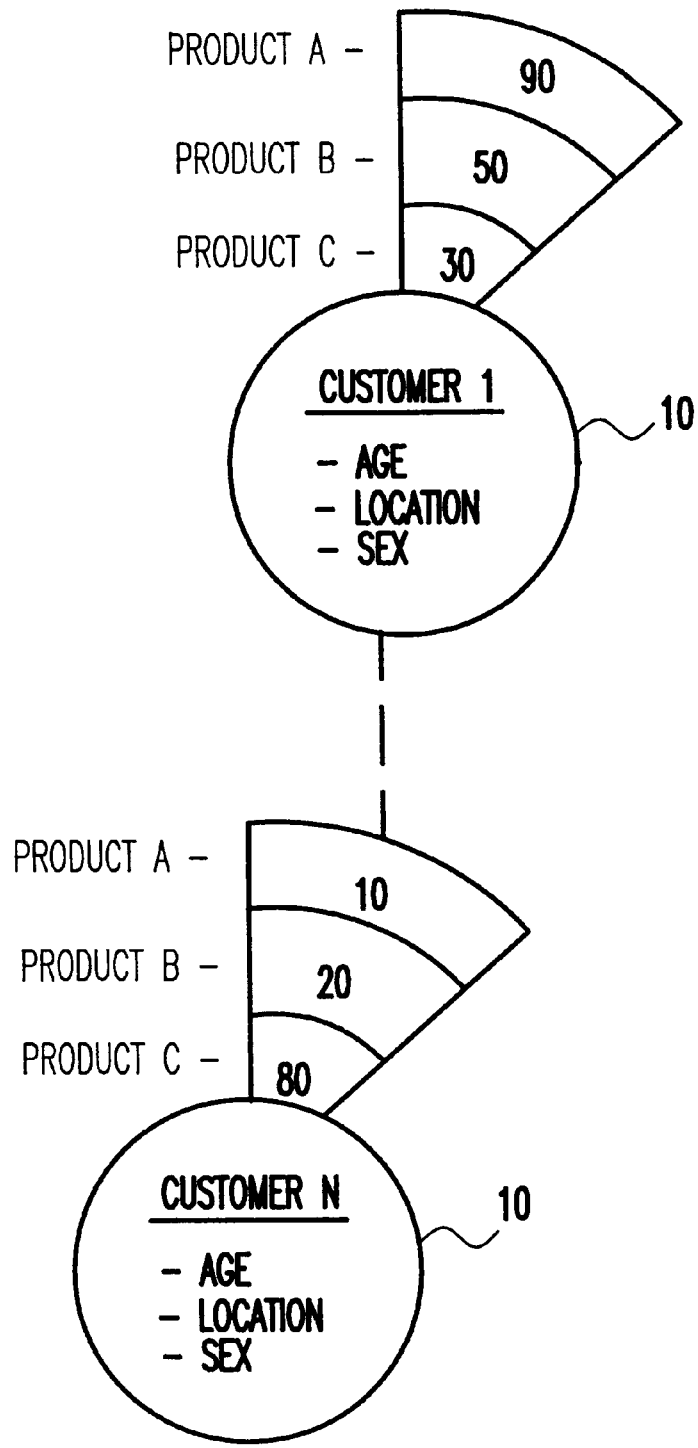
FIG. 4 is a conceptual diagram setting forth an example of how scores are assigned to customer records in a pre-scoring step in accordance with a second embodiment of the method of the present invention.

An example of how scores are assigned to each customer record is set forth in the conceptual diagram of FIG. 4. In FIG. 4, customer records 10 contain information on various attributes (age, location, and sex) of Customers 1 through N, which attributes may serve as a basis for determining Customer 1 through N's affinity for Products A, B, and C. Given these parameters, the method of the present invention would begin by computing scores for each of the customer records based on one or more of the attributes given. A score of 90, for example, might be computed for Customer 1 to indicate, on a 100-point scale, that there is a relatively high likelihood of a match between Customer 1 and Product A given Customer 1's age, location, and sex. (Thus, for example, if Product A is a skateboard and Customer 1's age, location, and sex are 15, New York, and male, a score of 90 would indicate a high likelihood exists that Customer 1 would be interested in buying Product A. On the other hand, a score of 10 might be computed for Customer N for the same product, if Customer N's age, location, and sex are 80, rural, and female, indicating a very low likelihood exists that Customer N would buy Product A.) Scores for Products B and C may be computed in an analogous manner. Those skilled in the art will appreciate that the example in FIG. 4 is merely illustrative, as different types and numbers of customer attributes may be used to generate the scores for the one or more products under consideration.

Returning to FIG. 3, a second step of the method involves formulating a search request to obtain the best customer leads from the database for a given product. The search request is formulated by, first, having a sales agent specify (1) a product is of interest and (2) zero or more preferences. (Block 101). The preferences specified may correspond to the types of customer attributes the user would most like to pursue. For example, if the user feels more comfortable soliciting business to older customers, then one of the specified preferences might be an age range of between 60 and 80. Other preferences might include location (e.g., New York City), sex (male or female), type of business (e.g., sporting goods) if the customer is a business, etc.

In the search request, the agent may also specify a maximum number of lead candidates to be returned by the search. (Block 100). For example, in the interest of time, the agent might want to specify that only 20 customer leads be output from the search. In this way, the agent, advantageously, may customize the output of the search, which is an improvement over conventional information systems.

Formulating a search request in accordance with the present invention is preferably performed at a workstation equipped with appropriate user-interface software for accepting search requests of the type discussed above. The user-interface software, for example, may permit a user to form a search request by inputting a formal search statement, or by merely filling in product and preference information at appropriate places on a displayed form.

Once formed, the search request may be stored in memory to relieve the user from having to re-formulate the search request. As an optional step of the method, therefore, after specifying the product and maximum number, a user may retrieve an old search statement from memory and modify it, including the product and preferences specified therein, as desired. (Block 102). It is further noted that while a user has been disclosed as performing this step of the invention, those skilled in the art can appreciate that the search request may be automatically formulated by a computer, either within or external to the system.

A third step of the method includes submitting the search request (Block 104) to a processor to identify those customer records that match the preferences in the request for the product specified. (Block 105). As will be explained in greater detail below, the processor may be included within a server of a network connecting one or more workstations dedicated to accepting search requests.

A fourth step of the method includes outputting the customer records produced by the search, or at least information indicative thereof, as customer lead information. (Block 106). Preferably, prior to output, these records are ordered based on the scores assigned to them in the pre-scoring step of the method for the product specified. The customer lead information may then be output in order of score, and preferably in descending order, to provide a user with an indication of the best customer leads. Through at least this ordering step, therefore, the method of the present invention can advantageously locate, with pinpoint accuracy, the best customer leads for a given product, an advantageous effect of which is to streamline the customer-soliciting process by increasing the efficiency and productivity of each individual sales agent.

The customer lead information produced from the search may, if desired, be output with a minimum amount of information, in order to increase output density and to prevent superfluous information from being output which can clutter coherency of the search results. This minimum amount of information may, for example, include merely one or more demographic attributes retrieved from the corresponding database record. Advantageously, the customer lead information is output without customer contact information, e.g., telephone numbers, names of key persons to contact, etc. Omitting this type of information may prove beneficial, at least because it may allow sales agents to access information (e.g., additional demographic attributes) which might not otherwise be available to them because of privacy issues.

A fifth step of the method includes the user selecting one or more of the customer leads output from the search (Block 107), at which time additional information from the customer record corresponding to the selected lead may be output (Block 108, Block 109, Block 110). This additional information may include the contact information associated with the selected customer leads. The method of the present invention in this additional respect, therefore, may be said to be interactive in nature.

A manner in which a search request is processed to derive customer leads in Block 105 will now be described. As previously mentioned, one of the steps in formulating the search request is to specify one or more preferences desired by the sales agent. These preferences may include multiple classes of preferences, with each class being given different treatment by the processor is during execution of the search statement. Advantageously, the preferences specified may include a set of mandatory preferences and a set of desired preferences, with each set including as few as one preference. Optionally, no preferences may be specified, so that an output may be obtained based only on the pre-scores.

Mandatory preferences correspond to those attributes which a customer must possess in order to qualify as one of the best customer leads. Mandatory preferences include, for example, attributes such as the geographic location of the customer. Desired preferences, on the other hand, refer to those attributes which are desired of a customer, but which are not necessary in order to qualify as one of the best customer leads. Desired preferences include, for example, the customer's age and sex. By designating preferences in this manner, the method of the claimed invention advantageously allows a user to perform at least two-hierarchical levels of searching to pinpoint, with greater accuracy, those customer prospects most likely to buy the agent's products. Of course, if desired, other types of preferences at different hierarchical levels of importance might be designated in the search request and processed accordingly.

Processing of a search request, thus, depends at least in part on the types of preferences specified. If only mandatory preferences are specified, the following processing steps are taken. First, a processor searches the database to locate customer records that match the specified preferences. Those records, or at least identifiers thereof, are stored in memory. A comparison is then made between the number of customer records having the preferences and the maximum number specified in the is search request.

If the number of customer records matching the specified preferences is less than the maximum number, the stored customer records are ordered based on the scores assigned to them in the initial step of the method, preferably in descending order, and then output for selection by the user. The method of the present invention, thus, outputs the best, or most probable, customer leads in ranked order of importance. This ranked output represents a substantial improvement over conventional methods, which merely return profuse amounts of search results in no apparent order of importance, thereby leaving the searcher with no assurance that the best results won't be overlooked.

If the number of customer records matching the specified preferences is greater than the maximum number, those records are ordered based on score and then only a preset number of them having the highest scores may be retained in memory. The preset number may, for example, be a system parameter. If desired, however, all the customer leads may be output, and those skilled in the art can further appreciate that the ordering step in both of the above situations may be performed before the comparison step, if desired.

Figure 5:
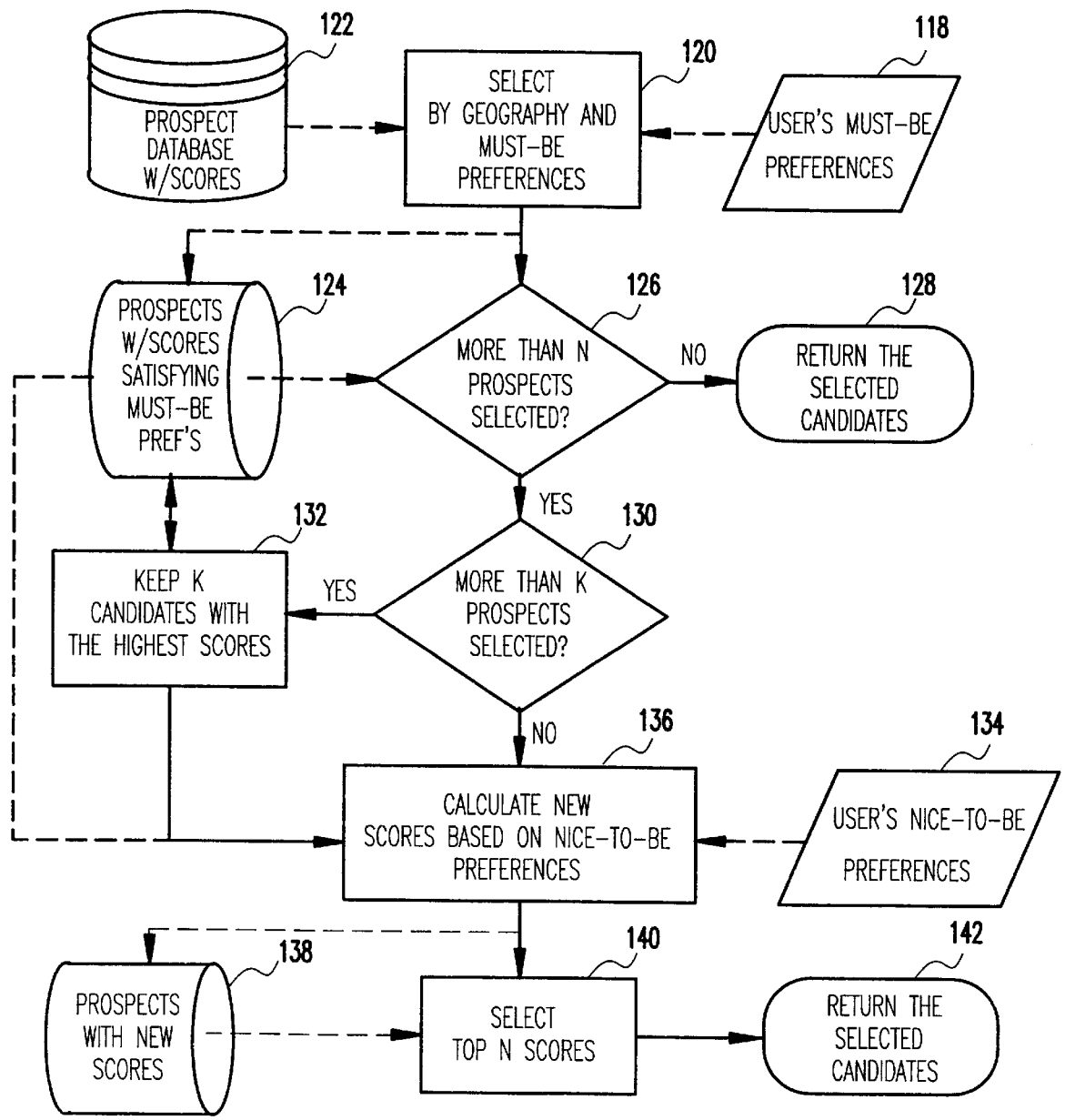
FIG. 5 is a flow diagram setting forth steps included in a second embodiment of the method of the present invention when mandatory and desired preferences have been specified in a search request.

If mandatory and desired preferences are specified, processing the search request may be performed in accordance with the flow diagram set forth in FIG. 5. In FIG. 5, the user's mandatory (or "Must-Be") preferences are first derived from the search request. (Block 118). (Optionally, the search request may designate a particular geographic area of interest as a mandatory preference apart from the other mandatory preferences specified in the search request. Block 120). The database is then searched to locate those customer records which match the mandatory preferences (Block 122) and those records are stored, either in the database or in memory (Block 124). A comparison is then made between the number of stored customer records and the maximum number specified in the search request. (Block 126).

If the number of stored customer records is less than the maximum number, the records are ordered by score and output to the user for selection. (Block 128). If, on the other hand, the number of stored customer records is greater than the maximum number, the customer records are ordered by score and their number compared with a preset number (K), which may be a system parameter (e.g., 500 records)and which, if desired, may be changed at the discretion of a system administrator. (Block 130). If more than K, K of the ordered customer records with the highest scores are retained in memory and the method proceeds to the next step. (Block 132). If less than K, the method proceeds to the next step directly. Those skilled in the art can appreciate that the ordering step may be performed before the comparison step, if desired.

In a next step, a search of the K customer records is performed based on the desired (or "Nice-To-Be") preferences derived the search request (Block 134), and a new score is computed for each record based on only the desired preferences. Block 136). The new scores provide an indication of how closely respective ones of the K customer records match the desired preferences designated in the search request. Computation of the new scores may be performed as described below.

After the new scores are computed, they and the K customer records are stored in memory, which may be the database, the memory in which the customer records from the mandatory-preference-search were stored, or different memories. (Block 138). The K records are then ordered by new score and a predetermined number of them selected for output. (Block 140 and 142).

As a further example of the present invention, and of how the new scores may be computed, consider the case where a search request designated multiple desired preferences, one of which is customer occupation divided into one of the following categories: professional, managerial, technical, or student. Consider, further, that each of the K customer records in the second collection are searched to determine how closely each matches the desired preference of occupation, i.e., professional or managerial occupations. A customer record having an occupation of managerial, then, may receive a new score higher than a customer record having no occupation information, and this latter customer record might be assigned a new score higher than a customer record having a data field designating an occupation of student.

Another desired preference might then be salary range, e.g., from $50,000 to $100,000. A customer record with income in that range might receive a higher new score than a customer record with a salary range of between $25,000 to $50,000, which would receive a higher new score than a customer record with a salary range of between $10,000 to $25,000. A final new score for each customer record would then correspond to a sum of the new scores assigned to each data record for respective ones of the desired preferences searched. Those skilled in the art can appreciate that alternative scoring schemes may be used for searching customer records based on desired preferences.

From the foregoing, it is apparent that the method of the present invention relieves sales agents from the tedious and inefficient task of searching through pages and pages of search results in effort to find customer leads for a given product. Instead, by the present invention, the agent can merely formulate a search request with any one or more of preference, product, and maximum number information and receive, in virtually no time, a list of the best customer leads ranked in order of importance. The invention further allows an agent to narrow his search by specifying desired preferences as an additional measure of pinpointing the best customer leads.

Further, when acquiring information is on a per-cost basis, the method of the present invention allows sales agents to choose for downloading only those records as customer leads that he is willing to pay for. For example, the method can be established so that a sales agent would not be charged merely to review the customer leads output from the method, but rather may be charged only upon selecting one or more of those leads to obtain the customer contact information related thereto. In this way, an agent may review as many records selected by the system as he chooses and be charged only for the ones he really wants. In at least these ways, then, the cost of performing a search can be substantially reduced.

Other optional steps of the method may be employed. For example, instead of pre-scoring the customer records, the method of the present invention might include searching customer records based on the mandatory preferences and then scoring the records matching the mandatory preferences in relation to a product of interest using one or more scoring models of the types previously discussed.

The present invention is, in another respect, a computer process which includes a computer program performed on or with aid of a computer. The computer program includes code sections for causing the computer to perform at least the steps included in the first and second embodiments of the method of the present invention.

Figure 6:
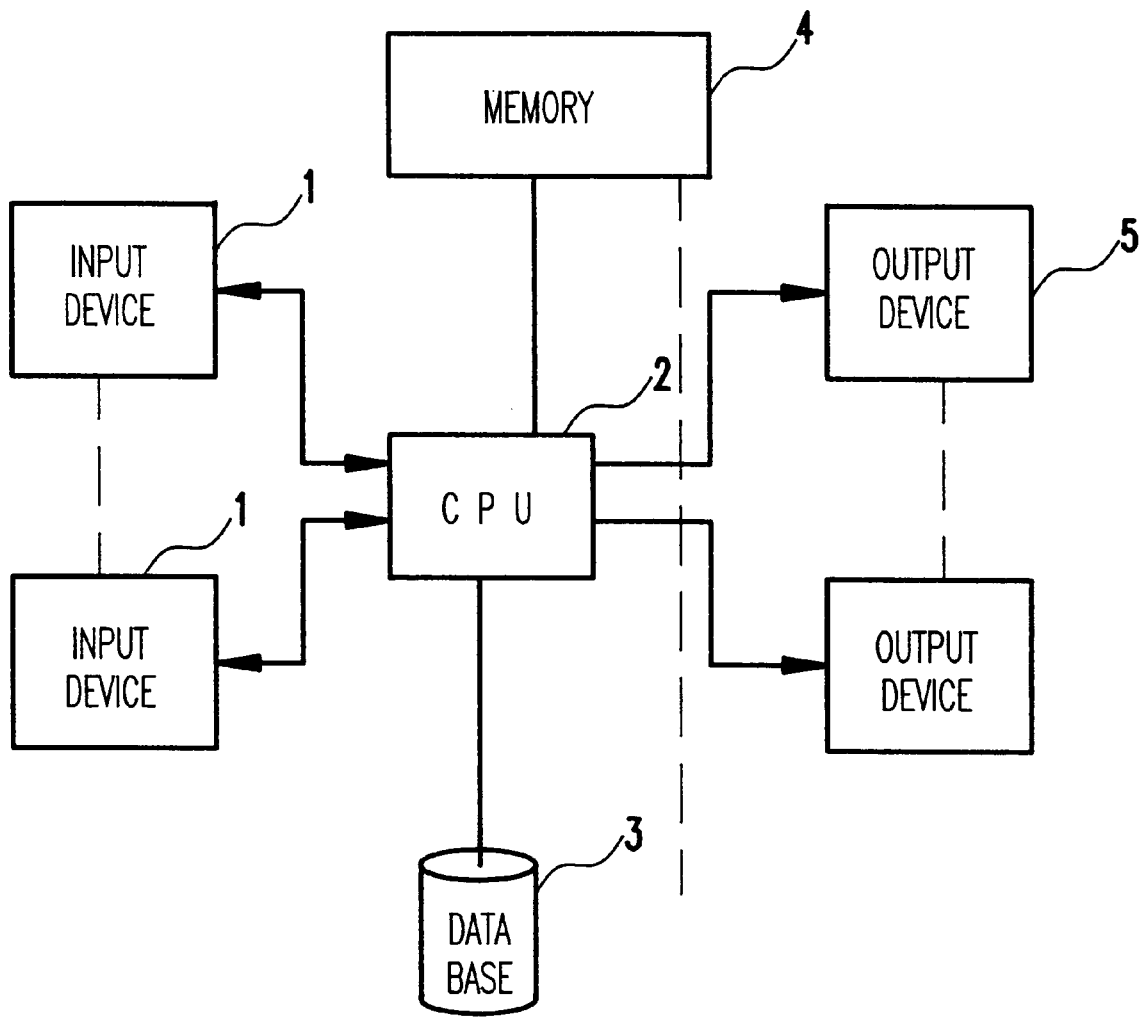
FIG. 6 is a block diagram of one embodiment of a system in accordance with the present invention.

The present invention is, in another respect, a system for retrieving information from a storage device. As shown in FIG. 6, the system includes at least one input device 1, a processor 2, at least one storage device 3, and memory 4.

Input device 1 may be a workstation equipped with appropriate software for allowing a user to formulate a search request thereon.

Processor 2 may be of a conventional type sufficient to process search requests formulated by the input device and to retrieve information from the database and memory, when required.

Storage device 3, preferably, is a database containing a plurality of data records each containing information of interest. Alternatively, device 3 may be any other conventional storage device, of large or small capacity, capable of storing data records therein of the type to be searched in accordance with the present invention.

Memory 4 may be any type of conventional memory capable of storing therein search results of the type produced by the present invention. If desired, memory 4 may be a portion of the database.

The system of the present invention may also include one or more output units 5 for outputting the results of searches performed by processor 2. If desired, however, the connections between input devices 1 and processor 2 may be bi-directional in nature, so that the input devices may also serve as the output units.

One particularly advantageous aspect of the present invention is that one or more features thereof may be interconnected by a network. For example, one or more of the input devices may be remotely located from the processor, for example, at different parts of the country. If so, connection therebetween may be made via LAN, WAN, land-based telephone line, cellular line, or any other conventional method. Processor 2 may, then, be located in a server of the network for processing the search requests formulated on the input devices.

Prior to processing a search request, a processor of the system computes scores for the data records stored in storage device 3, for example, in accordance with one or more of the processes previously discussed. This processor may be processor 2 or a different processor (not shown) within or external to the system. Once the scores are computed, they are either stored in storage device 3 with their respective data records or stored in another memory device for later retrieval.

In operation, a search request formulated by a user on one of the input devices is transmitted along one of a plurality of communications channels to the processor. The search request contains information specifying zero or more preferences, an item of interest, and a maximum number of search results to be returned. The processor then processes the search request in accordance with the steps included in the first and second embodiments of the method of the present invention. The different processing tasks, including computation of new scores, may be performed by processor 2, or may be performed by individually-dedicated processors (not shown) within the system.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example, in the method above, when a plurality of classes of traits, or preferences, are specified in a search request, data records in the first collection may, if desired, be output at a point prior to a search based on other classes of traits, or preferences. Other modifications are apparent.

What is claimed is:

1. A method for retrieving customer lead information from a marketing database, said database storing a plurality of customer records each containing data relating to a different customer, said method comprising steps of:

assigning scores to said plurality of customer records, each of said scores indicating a relationship between a respective one of said customer records and a product;

specifying a predetermined number of preferences;

determining whether each of said plurality of customer records satisfies said predetermined number of preferences;

defining, as a first collection of customer records, customer records which satisfy said predetermined number of preferences;

ordering said first collection of customer records based on the scores assigned to the customer records in said first collection in said assigning step;

outputting a predetermined number of customer records from said first collection of customer records in an order determined in said ordering step;

selecting a customer record from said predetermined number of customer records output from said first collection; and outputting information associated with said selected customer record.

2. The method of claim 1, wherein the relationship indicated by each of said scores is indicative of a likelihood of a match between a customer associated with a respective one of said customer records and said product.

3. The method of claim 2, wherein said likelihood of a match is determined by comparing customer descriptive information in said respective one of said customer records to said product.

4. The method of claim 1, wherein said predetermined number of preferences includes an attribute of a type of customer sought to be retrieved as a customer lead for said product.

5. The method of claim 4, wherein said determining step includes a step of comparing customer descriptive information in each of said plurality of customer records with said attribute to find a match therebetween.

6. The method of claim 1, wherein said outputting step includes outputting a predetermined number of customer records from said first collection of customer records having highest scores as assigned in said assigning step.

7. The method of claim 1, further comprising:

outputting the scores assigned to the customer records in said first collection.

8. The method of claim 1, wherein customer records in said first collection are output exclusive of customer contact information.

9. The method of claim 1, further comprising:

selecting a customer record from said predetermined number of customer records output from said first collection; and wherein said information associated with said selected customer record is contact information.

10. The method of claim 1, wherein said predetermined number of preferences and said product are specified in a search request which, when executed, causes said database to be searched for customer records in said first collection.

11. The method of claim 10, wherein said search request is formulated by one of a user and a computer.

12. The method of claim 1, wherein said predetermined number of preferences is zero.

13. The method of claim 1, wherein said assigning step occurs after said defining step and includes scoring customer records in said first collection to indicate a relationship between a respective one of the customer records in said first collection and a product.

14. A method for retrieving customer lead information from a marketing database, said database storing a plurality of customer records each containing data relating to a different customer, said method comprising steps of:

assigning scores to said plurality of customer records, each of said scores indicating a relationship between a respective one of said customer records and a product;

specifying a predetermined number of preferences;

determining whether each of said plurality of customer records satisfies said predetermined number of preferences;

defining, as a first collection of customer records, customer records which satisfy said predetermined number of preferences;

ordering said first collection of customer records based on the scores assigned to the customer records in said first collection in said assigning step;

defining, as a second collection of customer records, a predetermined number of customer records from said first collection having highest scores as assigned in said assigning step;

specifying a second predetermined number of preferences; and determining how closely the customer records in said second collection satisfy said second predetermined number of preferences.

15. The method of claim 14, wherein said ordering step includes ordering said first collection of customer records in descending order according to scores assigned in said assigning step.

16. The method of claim 14, further comprising:

assigning new scores to the customer records in said second collection, each of said new scores indicating how closely a respective one of the customer records in said second collection satisfies said second predetermined number of preferences; and ordering the customer records in said second collection based on said new scores.

17. The method of claim 16, wherein if the customer records in said first collection of customer records number less than or equal to said predetermined number of customer records, the customer records in said second collection are same as the customer records in said first collection.

18. The method of claim 16, further comprising:

outputting a predefined number of customer records from said second collection of customer records.

19. The method of claim 18, wherein said predefined number of customer records correspond to customer records in said second collection having highest new scores.

20. The method of claim 19, further comprising:

outputting the new scores assigned to said predefined number of customer records output from said second collection.

21. The method of claim 14, wherein said second predetermined number of preferences is zero.

22. A method for retrieving information in an information system, said system including a storage device for storing a plurality of data records, said method comprising steps of:

measuring a relationship between each of plurality of data records and an item of interest by comparing said item of interest to information contained in each of said data records;

designating a predetermined number of traits;

searching said plurality of data records to determine which ones of said plurality of data records possess said predetermined number of traits;

defining, as a first collection of data records, data records from said plurality of data records which possess said predetermined number of traits;

arranging the data records in said first collection based on the relationship measured for each of the data records in said first collection in said measuring step;

outputting a predetermined number of the data records in said first collection;

selecting at least one of the data records in said first collection; and outputting information from a data field of said at least one selected data record.

23. The method of claim 22, wherein said arranging step includes arranging the data records in said first collection in descending order of relevance, as determined by the relationships measured in said measuring step.

24. The method of claim 22, wherein said searching step includes a step of comparing said predetermined number of traits to information in a data field of each of said plurality of data records.

25. The method of claim 22, further comprising:
specifying a maximum number of data records to be included in said first collection.

26. The method of claim 22, wherein said predetermined number of traits is zero.

27. A method for retrieving information in an information system, said system including a storage device for storing a plurality of data records, said method comprising steps of:
measuring a relationship between each of plurality of data records and an item of interest by comparing said item of interest to information contained in each of said data records;
designating a predetermined number of traits;
searching said plurality of data records to determine which ones of said plurality of data records possess said predetermined number of traits;
defining, as a first collection of data records, data records from said plurality of data records which possess said predetermined number of traits;
arranging the data records in said first collection based on the relationship measured for each of the data records in said first collection in said measuring step;
defining, as a second collection of data records, a predetermined number of data records from said first collection having highest scores as assigned in said assigning step;
specifying a second predetermined number of traits;
determining how closely the data records in said second collection are related to said second predetermined number of traits; and
arranging the data records in said second collection based on how closely the data records in said second collection are related to said second predetermined number of traits.

28. The method of claim 27, wherein in said arranging step, the data records in said second collection are arranged in descending order of relevance.

29. The method of claim 27, further comprising:
outputting said second collection of data records as arranged in said arranging step.

30. The method of claim 29, further comprising:
selecting at least one of the data records output in said second collection; and
outputting information from a data field of said at least one selected data record as stored in said storage device.

31. The method of claim 27, wherein said second predetermined number of traits is zero.

32. A computer process comprising:
a computer program embodied in a computer-readable medium for retrieving customer lead information from a marketing database, said database storing a plurality of customer records each containing data relating to a different customer, said program being performed on or with aid of a computer and including:
(a) first code means for causing the computer to assign scores to said plurality of customer records, each of said scores indicating a relationship between a respective one of said customer records and a product;
(b) second code means for causing the computer to acknowledge a predetermined number of preferences;
(c) third code means for causing the computer to determine whether each of said plurality of customer records satisfies said at least one preference;
(d) fourth code means for causing the computer to define, as a first collection of customer records, customer records which satisfy said at least one preference;
(e) fifth code means for causing the computer to order said first collection of customer records based on the scores assigned to the customer records in said first collection by said first code means;
(f) in sixth code means for causing the computer to output a predetermined number of customer records from said first collection of customer records in an order determined by said fifth code means; and
(g) seventh code means for causing the computer to output information associated with a customer record selected by a user.

33. A system for retrieving information, comprising:
a storage device for storing a plurality of customer records;
a first processor for determining scores for each of said plurality of customer records, each of said scores indicating a relationship between a respective one of said customer records and a product;
an input device for receiving a search request containing a predetermined number of preferences;
a second processor, in communication with said input device, for processing the search request to derive a first collection of customer records which satisfy said predetermined number of preferences, said processor sorting the customer records in said first collection based on scores assigned to the customer records in said first collection by said first processor;
a memory unit, in communication with said second processor, for storing a predetermined number of said sorted customer records from said first collection; and
an output device for outputting at least one customer record from said first collection,
wherein said output device outputs a predetermined number of customer records from said first collection as sorted by said second processor, and
wherein said input device receives selection information for selecting said at least one customer record output on said output device, said output device outputting, in response to said selection information, data derived from a data field of said selected customer record.

34. The system of claim 33, wherein said data includes customer contact information.

35. The system of claim 33, wherein one of a user, second processor, and external computer inputs the search request received by said input device.

36. The system of claim 33, wherein said input device is remotely located from said first and second processors, and is connected thereto via a communications line.

37. The system of claim 36, wherein said communications line is one of a LAN, WAN, land-based telephone line, and cellular phone line.

38. The system of claim 33, wherein said output device is said input device.

39. The system of claim 33, wherein said second processor sorts the customer records in said first collection in descending order based on the scores determined for the customer records in said first collection by said first processor.

40. The system of claim 33, wherein said first processor and said second processor are a same processor.

41. A system for retrieving information, comprising:
 a storage device for storing a plurality of customer records;
 a first processor for determining scores for each of said plurality of customer records, each of said scores indicating a relationship between a respective one of said customer records and a product;
 an input device for receiving a search request containing a predetermined number of preferences;
 a second processor, in communication with said input device, for processing the search request to derive a first collection of customer records which satisfy said predetermined number of preferences, said processor sorting the customer records in said first collection based on scores assigned to the customer records in said first collection by said first processor;
 a memory unit, in communication with said second processor, for storing a predetermined number of said sorted customer records from said first collection; and
 an output device for outputting at least one customer record from said first collection,
  wherein said second processor defines, as a second collection of customer records, a predetermined number of customer records from said first collection having highest scores, and wherein said system further comprises:
   a third processor for determining how closely customer records in said first collection satisfy a second predetermined number of preferences included within said search request.

42. The system of claim 41, further comprising:
 a fourth processor for determining new scores for customer records in said second collection, each of said new scores indicating how closely a respective one of said customer records in said second collection satisfies said second predetermined number of preferences, said fourth processor further ordering the customer records in said second collection based on said new scores.

43. The system of claim 42, wherein said output device outputs a predetermined number of customer records from said second collection as ordered by said fourth processor.

44. The system of claim 43, wherein said predetermined number of customer records output from said second collection are said predetermined number of customer records from said second collection having highest new scores.

45. The system of claim 42, wherein said first processor, second processor, third processor, and fourth processor are a same processor.

46. The system of claim 41, wherein said first processor, second processor, and third processor are a same processor.

* * * * *